United States Patent [19]
Cummings, III

[11] Patent Number: 5,855,266
[45] Date of Patent: *Jan. 5, 1999

[54] FAN CLUTCH FOR VEHICLES CONFIGURED FOR LOW ENGINE SPEED

[75] Inventor: Gordon F. Cummings, III, Rockford, Ill.

[73] Assignee: Rockford Powertrain, Inc., Rockford, Ill.

[ * ] Notice: The term of this patent shall not extend beyond the expiration date of Pat. No. 5,667,045.

[21] Appl. No.: 841,426

[22] Filed: Apr. 22, 1997

Related U.S. Application Data

[63] Continuation-in-part of Ser. No. 532,226, Sep. 19, 1995, Pat. No. 5,667,045, which is a continuation-in-part of Ser. No. 529,357, Sep. 18, 1995, abandoned, Ser. No. 840,483, Apr. 21, 1997, and Ser. No. 837,537, Apr. 21, 1997.

[51] Int. Cl.$^6$ ..................................................... F16D 48/06
[52] U.S. Cl. .................................... 192/58.42; 192/70.12; 192/88 CA; 192/82 T; 192/103 F
[58] Field of Search .................................. 192/18 A, 12 C, 192/58.42, 70.12, 85 CA, 82 T, 103 F, 113.34; 123/41.12; 416/169 A

[56] References Cited

U.S. PATENT DOCUMENTS

| | | | |
|---|---|---|---|
| 2,879,872 | 3/1959 | Van Ranst | 192/104 |
| 3,207,279 | 9/1965 | Ahlen . | |
| 3,324,981 | 6/1967 | Aschauer . | |
| 3,587,537 | 6/1971 | Spokas . | |
| 3,592,022 | 7/1971 | Stokely . | |
| 3,804,219 | 4/1974 | Cummings, III . | |
| 3,805,931 | 4/1974 | Portmann . | |
| 3,848,622 | 11/1974 | Cummings, III . | |
| 3,915,269 | 10/1975 | Houser . | |
| 3,927,830 | 12/1975 | Briski . | |
| 3,985,214 | 10/1976 | Hall et al. . | |
| 4,066,157 | 1/1978 | Gibbs . | |
| 4,074,663 | 2/1978 | Cory . | |
| 4,081,064 | 3/1978 | Smith et al. . | |
| 4,086,995 | 5/1978 | Spokas . | |
| 4,094,393 | 6/1978 | Spokas . | |
| 4,123,905 | 11/1978 | Posega, Jr. . | |

(List continued on next page.)

FOREIGN PATENT DOCUMENTS

| | | | |
|---|---|---|---|
| 59-180557 | 8/1984 | Japan | F16D 23/12 |
| 1167774 | 10/1969 | United Kingdom | F16D 43/04 |

OTHER PUBLICATIONS

Fan Drives for Electronic Diesel Engines, *Diesel Progress Engines & Drives*, pp. 10 and 12 (undated).

*Primary Examiner*—Richard M. Lorence
*Attorney, Agent, or Firm*—Leydig, Voit & Mayer, Ltd.

[57] ABSTRACT

A clutch mechanism is provided for a cooling fan of a size capable of fitting into the limited envelope available in an over-the-road diesel tractor. A compact housing has a belt drive input and an output connected to the fan hub. The housing includes a pressure chamber in fluid communication with a pressurized air supply and a controllable valve in the air supply line for regulating the pressure in the pressure chamber when the clutch must be operated. The air pressure actuates an internal piston to translate the clutch in a continuously variable manner between engaged and disengaged conditions.

A small envelope clutch, having an outer diameter less than about 9.8 inches in diameter within the fan hub and less than about 6 inches under the belts and 7.3 inches overall so the housing may be positioned between the radiator and the engine, is capable of generating 150 foot-pounds of torque, running a 55 horsepower fan at 2100 rpm, and dissipating 10 horsepower of heat while in the slip mode. The clutch also has at least 130 inches in clutch area.

Fan speed is controlled utilizing a closed loop control system. The control system is capable of monitoring engine conditions and controlling fluid pressure actuating the clutch assembly to control the fan speed in response to the engine conditions.

31 Claims, 6 Drawing Sheets

U.S. PATENT DOCUMENTS

| | | |
|---|---|---|
| 4,131,187 | 12/1978 | Smith et al. . |
| 4,142,619 | 3/1979 | Spokas . |
| 4,214,652 | 7/1980 | Quenneville . |
| 4,231,457 | 11/1980 | Cornish . |
| 4,238,017 | 12/1980 | Spokas . |
| 4,337,628 | 7/1982 | Greene . |
| 4,348,990 | 9/1982 | Nolte et al. . |
| 4,352,276 | 10/1982 | Smith . |
| 4,425,879 | 1/1984 | Shadday et al. . |
| 4,456,110 | 6/1984 | Hanks et al. . |
| 4,474,082 | 10/1984 | Spokas et al. . |
| 4,483,430 | 11/1984 | Carmichael et al. . |
| 4,489,680 | 12/1984 | Spoakas et al. . |
| 4,535,879 | 8/1985 | Sturges . |
| 4,546,742 | 10/1985 | Sturges . |
| 4,555,910 | 12/1985 | Sturges . |
| 4,589,535 | 5/1986 | Hall et al. . |
| 4,637,504 | 1/1987 | Rule et al. . |
| 4,674,609 | 6/1987 | Sturges et al. . |
| 4,694,946 | 9/1987 | Pearch et al. . |
| 4,775,041 | 10/1988 | Boffelli . |
| 4,810,233 | 3/1989 | Crane, Jr. et al. . |
| 4,828,088 | 5/1989 | Mohan et al. . |
| 4,899,861 | 2/1990 | Cummings, III . |
| 5,078,533 | 1/1992 | Madonio et al. . |
| 5,178,584 | 1/1993 | Cummings, III et al. . |
| 5,222,574 | 6/1993 | Miller . |
| 5,224,446 | 7/1993 | Okita et al. .......................... 123/41.12 |
| 5,445,257 | 8/1995 | Grabis . |
| 5,487,457 | 1/1996 | Isanhart . |
| 5,667,045 | 9/1997 | Cummings, III .................... 192/18 A |

FAN CLUTCH FOR VEHICLES CONFIGURED FOR LOW ENGINE SPEED

RELATED APPLICATIONS

This application is a continuation-in-part of application Ser. No. 08/532,226, filed Sep. 19, 1995, for Continuously Variable Fan Drive Clutch Arrangement, now U.S. Pat. No. 5,667,045, which is a continuation-in-part of application Ser. No. 08/529,357, filed Sep. 18, 1995 (now abandoned) and co-pending application Ser. No. 08/840,483, filed Apr. 21, 1997 for Continuously Variable Fan Drive Clutch, and co-pending application Ser. No. 08/837,537 filed Apr. 21, 1997 for Continuously Variable Fan Drive Clutch, which is incorporated by reference into this application.

FIELD OF THE INVENTION

This invention relates to automotive engines and fuel economy, and more particularly to a fan clutch which enhances fuel economy.

BACKGROUND OF THE INVENTION

The field of immediate interest in the present application is that of over-the-road trucking. The economies of trucking dictate that fuel economy should be an important consideration. It is significant not only for large freight line companies owning huge fleets of trucks, but also for the single operator. Much effort has been expended in enhancing the fuel economy of automotive engines including, for example, making the vehicles more aerodynamic, increasing engine efficiencies, and reducing emissions.

The present invention is concerned with the requirement for providing forced air through the radiator for cooling the engine, air conditioning system, intercooler and the like. It is well known that a fan is, at times, needed for cooling and, at other times, unnecessary. It is also well known that the fan can be a major consumer of horsepower, often on the order of 55 horsepower, which will affect vehicle performance. Since horsepower is directly related to the speed cubed, it is desirable to operate the fan at the lowest available fan speed to minimize horsepower consumption. Similarly, it is undesirable to operate the fan when cooling is unnecessary or to overcool the engine. As such, a significant improvement in fuel economy and engine performance may be achieved if the fan is operated only when needed.

It has been found that the smaller pulley ratios have been unable to adequately cool the engine operating at lower engine speeds (typically about 1100 rpm). In order to solve the low fan speed problem and to properly cool the engine, it has been necessary to increase the fan to engine speed drive ratio from about 1:1 to 1.2–1.4:1. The system has been designed to meet the maximum heat rejection at the low engine speeds such as, for example, at about 1100 rpm. Thus, for engine speeds of about 1100 rpm, the fan will rotate at a speed capable of meeting the maximum heat rejection and necessary cooling requirements.

While that might, on the surface, solve the problem of fan speed at low engine speeds, it creates other problems when the engine operates at higher speeds. There can be significant periods of time when the truck is climbing or descending hills and the like, and where the vehicle is operated for extended periods of time at the higher engine speeds. By gearing down, a higher torque is achieved for climbing hills and the like. However, when the pulley ratio is simply changed to boost the fan speed at low engine speeds, the fan will be substantially overspeeded when the engine speed is increased as for hill climbing and the like. Indeed, the increased drive ratio may even attempt to operate the fan above its maximum rated speed. Moreover, operating the fan in the overspeed mode overcools the engine and unnecessarily increases engine horsepower draw and fuel waste.

Attempts of prior fan clutches to either reduce the speed of the fan or declutch the fan in conditions when it is not needed have not been entirely successful. Approaches utilizing dry clutches have typically resulted in on/off operation since the dry clutch could not slip for long without overheating. Inherent in on/off applications is the typical shock load to the drive unit when the drive clutch is engaged. The shock load is not only undesirable from the viewpoint of loading and wear on the mechanism, but is also aesthetically detrimental. When the vehicle is parked, for example, but the engine is running in order to maintain heat or cooling, the fan clutch will typically cycle on and off, creating significant audible disturbance. A further disadvantage of on/off operation is that the system is effectively a coolant temperature loop control system. This introduces a response time delay and the clutch mechanism is incapable of dynamically responding to engine conditions to insure that the fan operates at precisely the desired speed and/or to selectively determine fan speed.

One attempt to avoid the problems with dry clutch fan drives has been the attempted use of viscous coupling between the input and output members of the drive unit. Unfortunately, these approaches have also had their drawbacks. First, viscous couplings have poor release capability and no "lock-up" capability so that the drive input and output members may not be driven at the same speed. Moreover, fan drives using viscous couplings have limited horsepower capability, and cannot quickly dissipate heat from the engine. Most viscous coupling designs are slow to engage after sensing heat, and cannot be completely declutched when cooling is not desired.

Wet clutch mechanisms for driving engine fans have also been used. Wet clutch mechanisms, which typically use oil in the engine sump, have been used to provide relatively continuously variable speed, and will not overheat under most conditions by virtue of the oil-bathed clutch mechanism. If space were not a problem, it would be relatively straightforward to provide a continuously variable relatively reliable clutch mechanism to couple the fan and engine. However, when one appreciates the desires of the truck and engine designers to minimize the space requirements "under-the-hood" and the critical need to efficiently use the under-the-hood space, it will be quickly appreciated that a relatively small envelope is available for the clutch mechanism. The envelope is limited axially by the distance between the radiator and the engine, and it is limited radially, as a practical matter, by the size of sheave which can be accommodated for the pulley driving the fan.

In engines having relatively wide operating rpm ranges, and therefore wide operating oil pressure ranges, the clutch mechanism must have a relatively large hydraulic piston operating area to reliably operate the clutch at the oil pressure extremes, that is, from relatively low oil pressures at idle to relatively high oil pressures at high engine speeds. Similarly, they have required relatively bulky mechanisms to pump or pressurize the oil in the clutch housing As a result, wet clutches with adequate horsepower for fan drive operation have been relatively large.

In some applications, such as off-the-road vehicles including tractors, loaders, graders and the like, there is adequate room in the engine compartment to tolerate the relatively large clutch mechanisms typically associated with wet clutches. However, in other applications where space requirements are more critical, including, for example, over-the-road tractors, the requirements for aerodynamics, appearance, vehicle size, vehicle weight and the like have all combined to reduce the size of the engine compartment. Thus, the relatively large wet clutches having adequate horsepower for fan operation are less compact than desired and may pose a problem for such applications.

SUMMARY AND OBJECTS OF THE INVENTION

In view of the foregoing, it is an aim of the present invention to provide a fan clutch system which is configured to complement the low engine speed by providing an engine/fan speed relationship which is different than any which has been provided heretofore.

In that respect, it is an object of the present invention to provide a fan clutch for use with such an engine in which the fan clutch can operate in continuous slip mode.

A further object of the invention is to provide a fan clutch which has drive ratio capable of normally overdriving the fan, and which has a control system sensitive to fan speed and which includes a clipping mode module adapted to place the fan in the continuous slip mode whenever the engine would tend to significantly overspeed the fan.

Taking a somewhat broader view, it is an objective of the present invention to provide a fan clutch system for a diesel tractor engine which has two extended operating conditions, one in which the drive ratios overdrive the fan so that it operates at full flow rate at low cruising engine speeds, and the other in which the fan is capable of continuous slip operation. In certain ways, the fan system of the present invention provides two fan packages for an engine which has new operating characteristics, 1) a variable speed fan clutch operable at low engine speeds to drive the fan anywhere between full off and full engine speed, and 2) a variable speed fan clutch capable of reliably operating for significant periods of time in the slip mode under high engine speed conditions.

These and other features and advantages of the invention will be more readily apparent upon reading the following description of a preferred exemplified embodiment of the invention and upon reference to the accompanying drawings.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Figure 1:
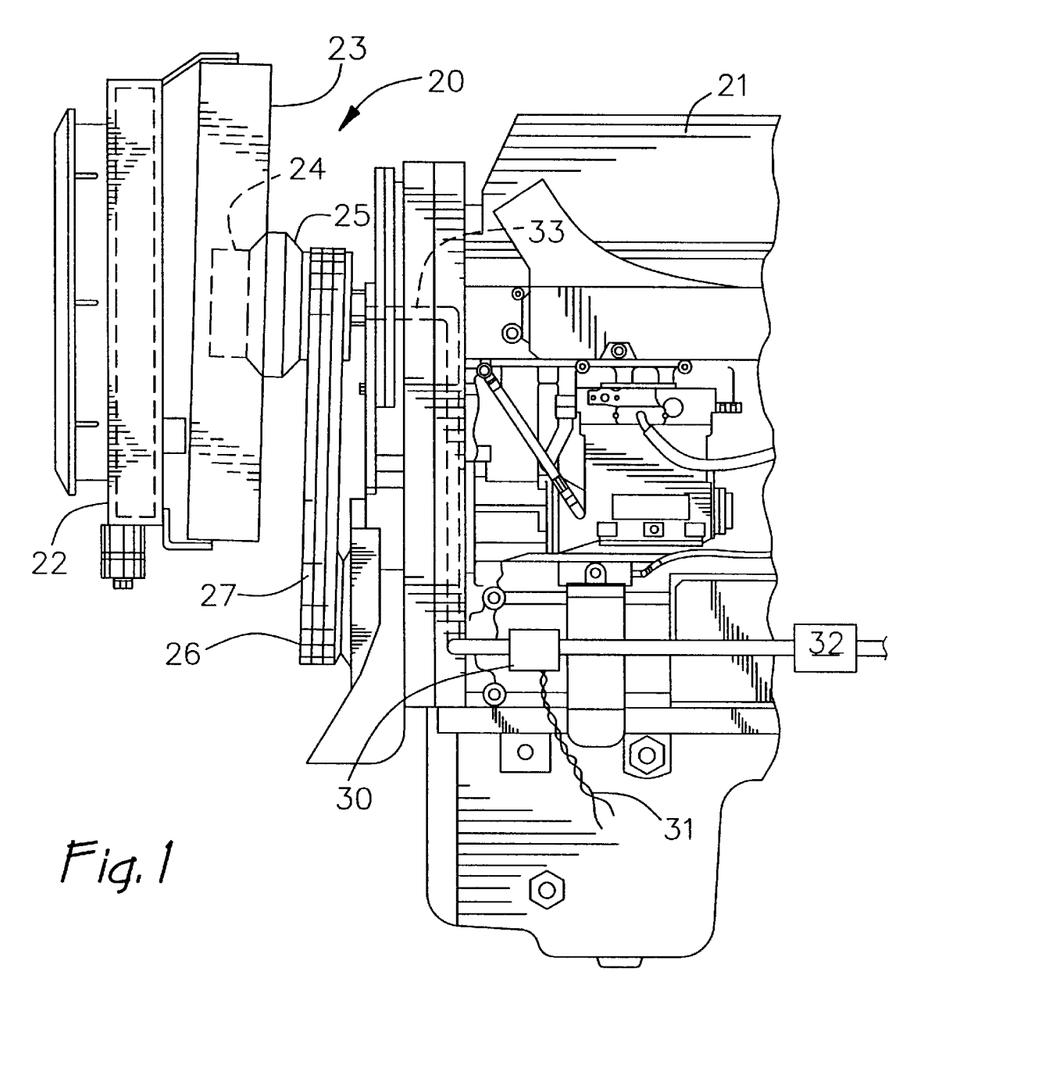
FIG. 1 is a partial elevation showing the front end of an engine and an associated cooling fan and pneumatic clutch mechanism in accordance with the present invention.

Turning to the drawings, and particularly FIG. 1, a fan clutch 20 is shown in association with an engine 21 typically used in over-the-road applications and a conventional radiator 22 capable of supplying cooling for over-the-road engines. A fan 23 is shown connected to a fan hub 24 which in turn is driven by a fan clutch mechanism 25. The fan clutch mechanism 25 is driven by a crankshaft output or accessory drive pulley 26 connected to the sheave of the fan drive 25 by a set of drive belts 27. The clutch mechanism 25 couples power transmitted by the drive belts 27 from the engine to the fan 23.

In accordance with the invention, the fan clutch mechanism 20 has a continuously variable output speed, controlled by an electrical signal responsive to cooling needs, so that the fan 23 rotates at a speed needed by the engine for adequate cooling. In some cases, the fan 23 may be de-clutched so that the load by the drive belts 27 on the engine is minimized or eliminated. In other cases, the fan 23 may be operated in an overspeed condition to provide additional cooling.

Figure 2:
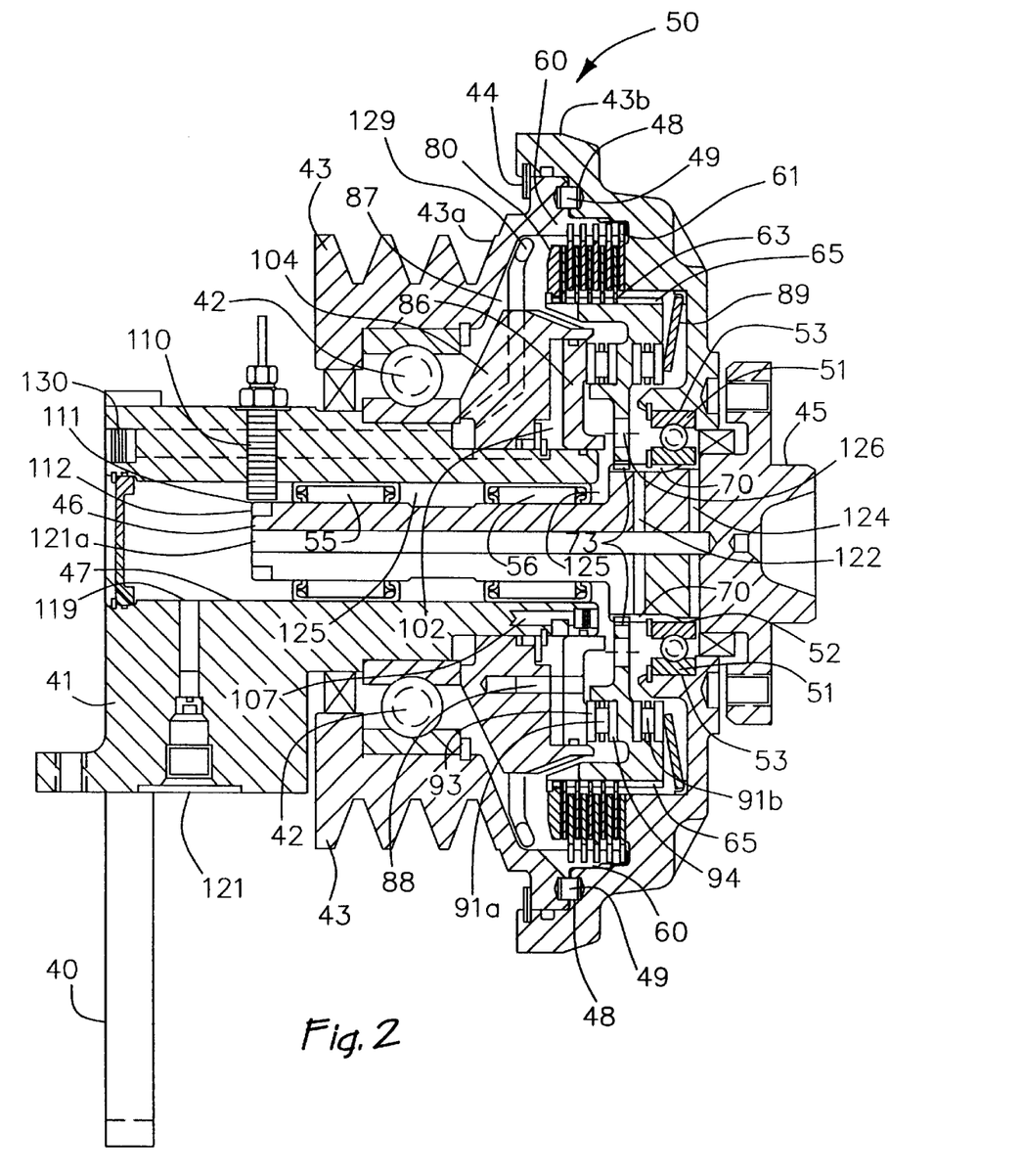
FIG. 2 is a cross-sectional view of the fan clutch of FIG. 1.
Figure 4:
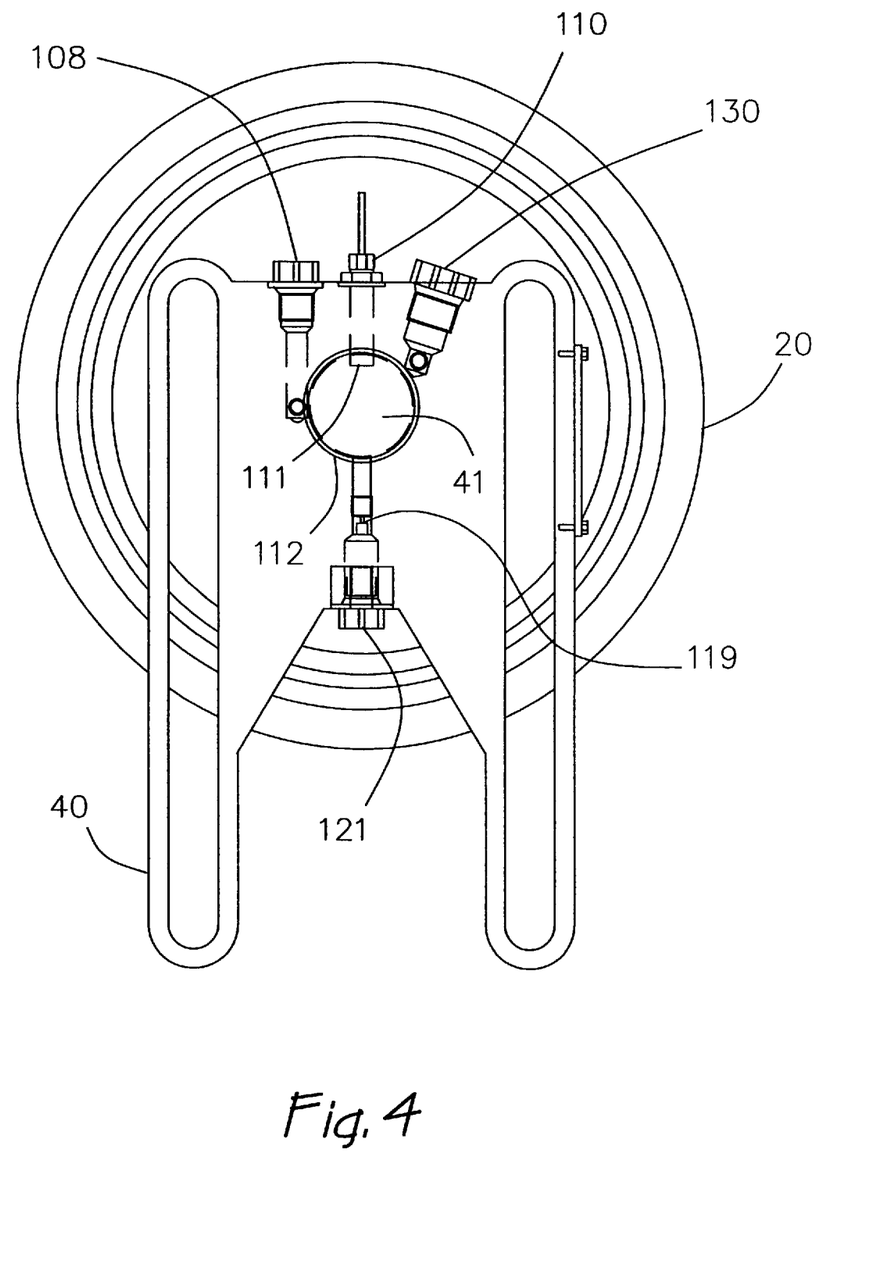
FIG. 4 is an end view of the fan clutch of FIG. 2.

As best shown in FIGS. 2 and 4, the fan clutch 20 includes a mounting bracket 40 which is securely fixed to the engine 21. The mounting bracket 40 has an axial mounting shaft 41 which carries the rotating elements of the fan clutch 20. The cylindrical and hollow shaft 41 externally supports a main bearing 42 which mounts an engine-driven main drive housing 43 configured to fit the belt drive 27. The belt drive 27 is located just above the bearing 42 so that the load on the bearing 42 is generally radial with respect to the mounting shaft 41. A fan drive hub 45 has an extended shaft 46 which fits within a cylindrical aperture 47 of the mounting shaft 41. A clutch mechanism generally referenced at 50 variably connects the main drive housing 43 to the fan drive hub 45. When the clutch is fully engaged, the fan drive hub 45 rotates at the same speed as the main input or drive housing 43. As the clutch is gradually disengaged, the fan drive hub 45 slows down relative to the input drive housing 43, until the clutch is fully released or declutched, wherein a brake holds the fan drive hub 45 stationary while the input housing 43 continues to rotate in response to the belt drive 27.

Figure 3:
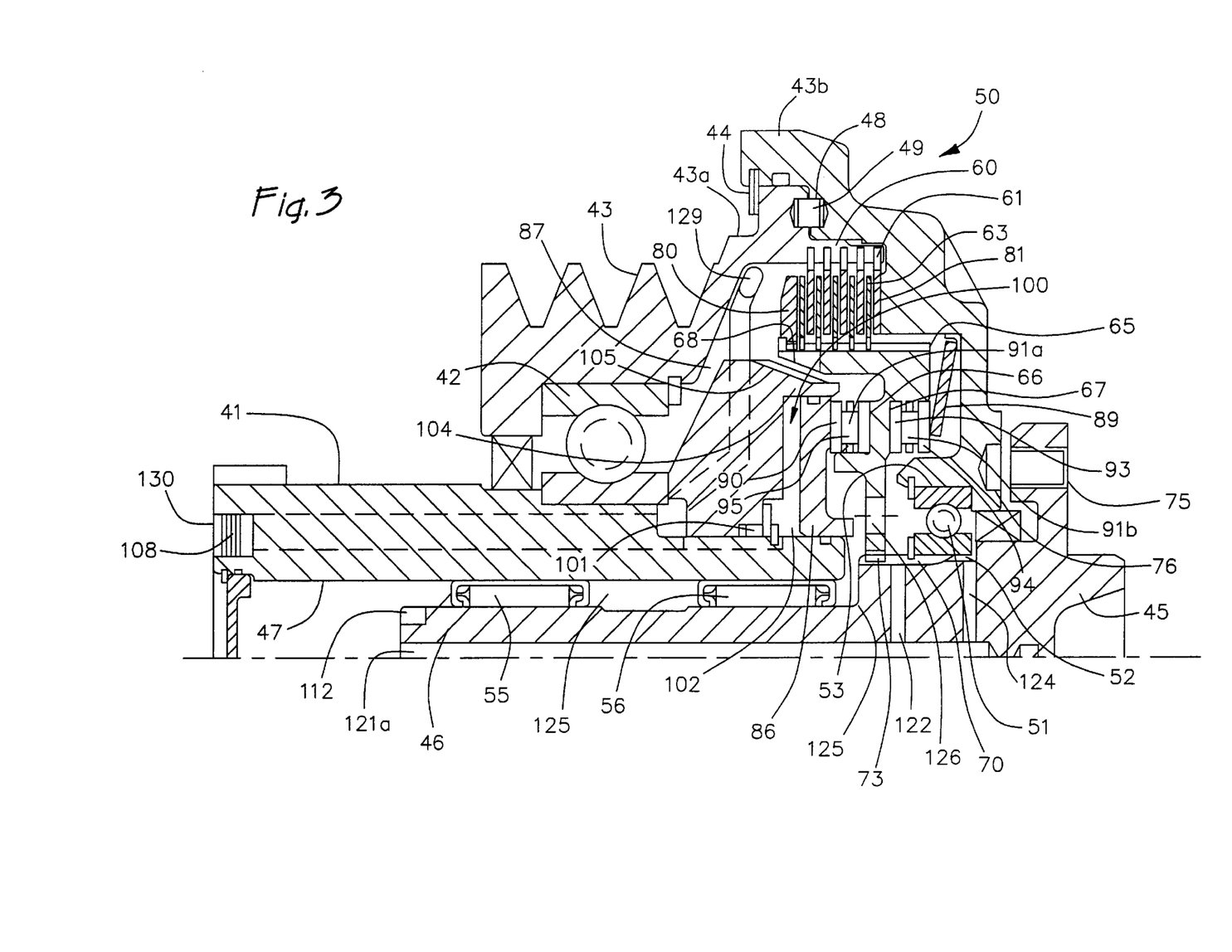
FIG. 3 is an enlarged cross-sectional view of the fan clutch of FIG. 2.

For axially constraining the fan drive hub 45 relative to the input housing 43, another bearing 51 is interposed between surface 52 on the drive hub 45 and surface 53 on the main drive housing 43 (FIG. 3). Bearings 55, 56 engage a shaft portion 46 of the drive hub 45 for rotatably supporting the hub 45 within the mounting shaft 41. Oil seals and retainer rings and the like are shown in the drawings, but will not be described in great detail since one of ordinary skill in the art will recognize the structure and functionality of such elements from their appearance in the figures.

Referring to the clutch mechanism 50 in FIG. 3, it will be seen that the outer diameter of the drive housing 43 has an annular flange 60 which carries a plurality of driving clutch plates 61. The driving clutch plates 61 are axially slidable in splines on the flange 60 so that they are rotated with the drive housing 43. A plurality of driven clutch plates 63 are interposed in the driving clutch plates 61. The illustrated embodiment has five driving clutch plates 61 and driven clutch plates 63. It will be appreciated that, in accordance with certain objects of the invention to minimize the size of the clutch package, disposing the clutch plates 61, 63 adjacent the outer diameter of the drive housing 43 maximizes the clutch plate area for a given housing diameter. In a small envelope clutch having less than a 9.8 inch diameter within the fan hub, the clutch plates should have at least 130 square inches of clutch plate area. The driven clutch plates 63 are carried by an internal clutch hub 65 and are axially slidable on splines on the hub 65 so that the driven clutch plates 63 may slide axially relative to each other to either engage or release the driving clutch plates 61. The clutch hub 65 also has an internal spline 73 which matingly engages an external spline 70 on the drive hub 45 to form a splined connection 70, 73 for driving the fan hub 45 in response to the drive housing 43. The clutch hub spline 73 may slide axially along the drive hub spline 70 when the clutch plates 61, 63 are substantially disengaged and the spring 89 is able to overcome the load which may be exerted on the spline connection 70, 73.

Referring to FIGS. 2–3, it will be seen that the clutch plates 61, 63 are disposed between a pressure plate 80 and an operating face 81 of the drive housing 43. The operating face 81 of the drive housing 43 cooperates with the pressure plate to press the clutch plates together, thereby eliminating the need for an opposing pressure plate and, in accordance with certain objects of the invention, minimizing the package size of the clutch mechanism 20. The pressure plate 80, disposed to the left of the interposed clutch plates 61, 63, is carried by the internal clutch hub 65 for actuating the clutch 50.

The driving housing 43 comprises a piston housing generally referenced as 87. The piston housing 87 has a clutch piston 86 and a cone brake 104. The clutch piston 86 is mounted over the stationary mounting shaft 41 so as to be axially movable to actuate the pressure plate 80 and, ultimately, to operate the clutch 50. Interposed between the operating face 90 of the clutch piston 86 and left face 66 of the internal clutch hub 65 is a thrust-bearing assembly 91a. A thrust bearing assembly 91b is also interposed between the right face 67 of the clutch hub 65 and spring 89. The assemblies 91a and 91b include a pair of thrust washers 93, 94, one adjacent to the operating face 90 of the clutch piston 86 or the spring 89 and one in contact to the respective faces 66, 67 of the internal clutch hub 65. Interposed between the thrust washers 93, 94 is a needle-bearing assembly 95 for allowing relative rotation between the two thrust washers 93, 94. A lug or pin 88 may be disposed in the cone brake 104 and the piston 86 to prevent the piston from rotating in response to any rotation of the thrust washers 93, 94. Thus, axial forces generated by the clutch piston 86 are transmitted through the thrust-bearing assembly 96 to the internal clutch hub 65 and to the pressure plate 80 to control the amount of pressure on the clutch plates 61, 63. Similarly, axial forces generated by the spring 89 are transmitted to the internal clutch hub 65 to declutch the clutch mechanism and release the clutch plates 61, 63. It will be seen, upon reference to FIGS. 2–3, that the spring is laterally spaced from the clutch plates 61, 63 for minimizing the package size.

In accordance with certain objects of the invention, the clutch mechanism is provided with a pneumatic actuator assembly generally referenced as 100. Referring to FIGS. 2–3, the piston housing 87 has a pneumatic chamber 102 defined by a cone brake 104 and the clutch piston 86. The air pressure chamber 102 is sealed and separated from the oil and other contaminates by seals 101. The clutch is operated by controlling the air pressure in the pressure chamber 102. In order to supply air pressure to the air chamber 102, it will be seen that the air chamber is fed by an air passage generally denoted by 107 which is in communication with an air inlet port 108 and the air supply 32, respectively. When the pressure chamber 102 is fully pressurized, it will be appreciated that the pressure displaces the clutch piston 86 to right the as shown in FIG. 2. The clutch piston 86, acting through the thrust bearing 91a, 91b, overcomes the spring force to compress the spring 89 and translate the clutch hub 65 to the right. Increases in pressure permit the clutch plates 61, 63 to engage each other and rotate the fan hub 45. As the pressure in the pressure chamber 102 is decreased, the leftward action of the spring 89 begins to cause the clutch plates 61, 63 to slip, allowing the fan hub 45 to slow down relative to the drive housing 43. Release of the pressure in the chamber 102 allows the spring 89 to fully disengage the plates 61, 63 causing the fan hub 45 to be fully released from the drive hub 43.

It should now also be appreciated that the clutch hub 65 may be isolated between the two bearings 91a and 91b so that the hub 65 may slide axially along the spline 70 when the spring 89 overcomes the friction on the spline connection 70, 73 resulting from torque generated by minor clutch slippage or the inherent viscous drag in the viscous mode from the cooling oil which may drive the fan 23. When there is a torque on the spline connection, the spline connection is relatively stationary for normal operating pressure. The capacity of the clutch will be determined by compressive pressure on the clutch plates 61, 63 resulting from the pressure exerted on the stationary hub 65, not the movement of the clutch hub 65. Stated another way, the capacity of the clutch is to be positioned between a fully-engaged position, wherein the fan drive housing and the fan drive hub rotate at the same speed, and a declutched position wherein the drive hub is stationary, is a function of the pressure exerted on the clutch hub 65.

In accordance with objects of the present invention, means are provided for sensing the actual speed of the fan drive hub 45 and controlling the fan speed. In the illustrated embodiment, a speed sensor 110, fixed in the mounting shaft 41, has a sensing face 111 which faces a toothed section 112 on the hub shaft 47. Thus, as the hub 45 rotates, the sensor 110 counts the passage of gear teeth 112, and electrical circuitry counts the number of teeth 112 passing per unit time to determine the rotational speed of the hub 45. Due to the precise control of hub speed which is achievable in accordance with the present invention, means can be provided for electrically setting a desired fan speed and assuring that the fan 23 is rotating at the desired speed by means of the speed sensing pickup. It will be appreciated that the present system permits the clutch plate pressure to be controlled by controlling the fan hub speed without having to directly measure the plate pressure.

Referring briefly to FIG. 1, it will be seen that a linear valve 30 is mounted on or near the engine 21 in the air supply line from a pressurized air supply 32 to the fan clutch 20. Electrical connections 31 to the valve 30 allow for the continuously variable adjustment of the valve 30 which in turn allows for the control of the pressure in the air pressure chamber 102 in the clutch housing. It should now be appreciated that the pressure in the pressure chamber 102 serves to operate the clutch piston 86, and thereby causes the partial or full release of the clutch 61, 63. The magnitude of the electrical control signal controls the valve 30, the pressure in the pressure chamber 102, the position of the piston 86 and therefore the state of the clutch mechanism, i.e., clutch position between the declutched and fully engaged positions. As the fan speed is measured by the speed sensor 110, the electrical control circuitry continues to alter the signal to the control valve 30 until the sensed speed matches the desired speed. Deviations in speed can be instantly detected by the speed sensor 110, and the signal adjusted to control the air supply valve 30 according to the desired setting.

In accordance with certain objects of the invention, means are provided for assuring that the fan 23 remains stationary under conditions when the electronics demand zero speed. In conventional wet clutches of the type illustrated, there will be inherent viscous drag from the cooling oil which may continuously drive the fan 23, even with the clutch 20 completely disengaged. This is undesirable in certain situations, such as very cold ambient conditions, where the engine 21 could experience overcooling from the flow of air over the engine 21.

The fan clutch 20 has a cone brake mechanism 104 for completely stopping the fan 21 after the clutch 50 is fully released. The brake mechanism 104 comprises a pair of cooperating brake surfaces 105, 68. The cone brake 104 is fixedly mounted to the stationary mounting shaft 41 and is, thus, non-rotational and fixed. The cone brake 104 has an inclined face 105 which may selectively engage a cooperating inclined face 68 on the inside face of the clutch hub 65 when the clutch is declutched and the clutch plates 61, 63 are disengaged. It will be appreciated that, in accordance with certain objects to minimize the clutch size, the inclined face multiplies the spring pressure and minimizes the need for high spring forces. When the spring 89 pushes the clutch hub 65 sufficiently to the left, the clutch will begin to slip more and more until ultimately the clutch plates 61, 63 are fully released. At that point, the drive hub 45 will be locked in position by virtue of the contact of the face 68 which is part of the drive hub 45 and the face 105 which is part of the non-rotational cone brake 104. Even in the presence of oil drag in the clutch assembly, the fan will remain in a completely stationary position. Thus, it will be appreciated that, in the normal unactuated condition, the clutch is maintained in the release condition by the spring 89, and requires pneumatic pressure to release the brake and engage the clutch.

In accordance with certain objects of the invention, the clutch mechanism has a unique feature permitting the operator to selectively overcome the unactuated condition in the event of an emergency. Referring to FIG. 3, the drive hub 45 and drive housing 43 have corresponding bolt holes 75, 76, respectively, which receive a bolt (now shown). In normal operation, there is clearance between the drive hub 45 and drive housing 43 and the bolt is carried by the fan hub 45 as shown in FIG. 3. In conditions where the clutch mechanism 50 has failed, the operator may selectively remove a spacer/washer from under the head of the bolt allowing the bolt to engage both holes 75, 76 to temporarily attach the fan hub 45 and drive housing 43 together and enable the fan to cool the engine while the vehicle is driven to obtain maintenance without overheating the engine. It will also be seen in FIG. 2, that the drive housing is comprised of two mating sections generally referenced as 43*a* and 43*b* which are connected together by a snap ring 44. The sections 43*a*, 43*b* have mating bores referenced as 48 for receiving a pin 49 for carrying the torque generated on the cover section 43*b* by the fan hub 45 when the "come home" feature is utilized. It will, of course, be appreciated that this feature is not necessary for the normal operation of the invention.

It should now be appreciated that, fundamentally, the clutch drive of this invention is a multi-plate wet (oil-lubricated) clutch 61, 63 which variably connects a cooling fan hub 45 of a vehicle to an engine driven input housing 43 in response to an electrical signal. The electrical control signal is generated, as will be described below, from engine control electronics, or otherwise. A control circuit senses the actual fan speed by means of a speed pickup 110 and thus has the capacity for rather precise feedback control over fan speed. The clutch starts in its initial and unactuated condition wherein the clutch is normally maintained in the disengaged condition with the brake engaged by spring 89. The air supply pressure is controlled by the electrically operated restricting valve 30 so that electrical control signals may operate the valve to supply pressurized air to the clutch housing. Preferably the valve output and the pressure chamber pressure varies from 0 psi to 100 psi when fully open. The resulting air pressure overcomes the spring 89 to release the brake and actuate the clutch plates 61, 63 into engagement with each other and ultimately to drive the fan hub 45 as described above. In accordance with certain objects of the invention to provide a small envelope fan clutch, the present invention permits the piston area to be relatively small, preferably less than about 13 square inches, thereby minimizing the clutch package.

The clutch mechanism is oil lubricated using the lubricating system from the engine 21. An aperture 119 in the main bracket 40 communicates with the oil inlet port 121 to receive oil from the engine 21. The engine oil flow is supplied by a conventional engine oil pump (not shown), and the oil pressure is typically dependent on engine speed. Oil which enters the clutch through oil inlet port 121 is coupled through internal bore 121*a* in the fan drive hub 45. Passage 124 is provided for lubricating bearing 51. Oil passage 125 is provided for lubricating bearings 55, 56, 91*a* and 91*b*. The flow through the center of the shaft is ported through oil passages 122 and 126 in the clutch hub 65 to the clutch pack 50 where it cools the continuously slipping clutch plates 61, 63. After the oil passes through the clutch plates 61, 63, it passes through the Pitot tube 129 and oil outlet port 130. It will be appreciated that the Pitot tube insures continuous oil flow across the clutch plates 61, 63 and permits the oil pressure within the fan clutch 20 to be relatively non-pressurized (e.g., typically less about 15 psi and preferably less than about 5 psi).

In order to dissipate about 10 horsepower in heat in slip mode by passing oil through the clutch 50, the small envelope fan clutch 20 of the present invention is capable of passing less than about 5 gallons/minute through the clutch 50. In a more preferred embodiment, the fan clutch 20 is capable of passing less than about 2.5 gallons/minute to dissipate 10 horsepower of heat. In a most preferred embodiment, the fan clutch 20 is capable of passing less than about 2.0 gallons/minute to dissipate 10 horsepower of heat.

Figure 5:
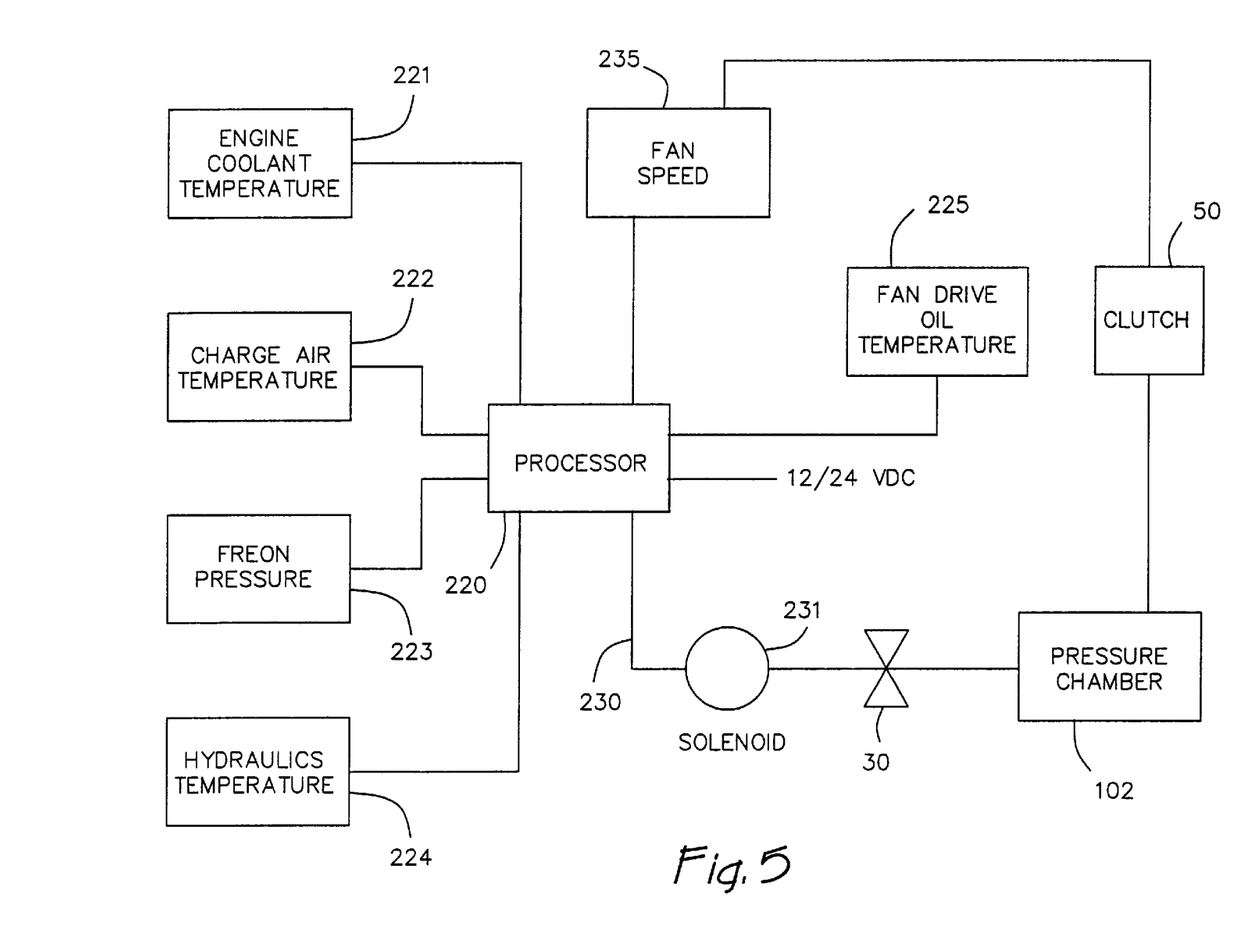
FIG. 5 is an electrical block diagram showing one form of control for the fan drive of FIG. 1.

One form of electrical circuitry of particular use with a fan clutch mechanism of the present invention is illustrated schematically in FIG. 5. The control circuitry illustrated depicts a closed loop control system for controlling the fan speed and minimizing fan speed under all engine operating conditions. Thus, the invention is capable of dynamically responding to external interferences (e.g. friction, wind, temperature, and the like) to insure that the fan speed is maintained at the desired level without drawing unnecessary power from the engine. The control circuitry is based on the use of a central processor 220 which can be a separate computer or a part of the main electronic computer which controls the engine. The processor 220 may have a plurality of inputs including, for example, an input 221 relating to engine coolant temperature, an input 222 relating to supercharged air temperature, an inlet 223 relating to the temperature and/or pressure of the freon in the air conditioning system, and a further input 224 relating to the temperature of the hydraulic fluid and/or engine oil in the system. The processor 220 is provided with a series of processing algorithms which sense these conditions and respond in whatever way is appropriate for the particular engine to produce an output signal indicative of a desired fan speed.

The clutch is electronically controlled, and thus any number of electrical or electromechanical inputs can be utilized to assemble the fan speed signal. For example, a fan drive oil temperature signal 225 illustrates a safety feature for the fan clutch system in that oil temperature can be measured, for example, at the outlet of the fan clutch drive, and if an excessive temperature is encountered indicating that the clutch is overheating, the processor 220 can respond by simply fully engaging the clutch, so there is no slippage whatsoever in the clutch mechanism until the condition is corrected.

In other examples, the engine coolant temperature can be monitored so that the fan is modulated in the temperature range between about 205° and 215° F. Above 215° F., the fan is fully engaged. With respect to charge air temperature, the fan can be modulated in the range between about 160° and 175° F. Freon temperature at the outlet of the compressor is sensed, and when the temperature is in the range of 180° to 190° F. or the pressure is in the range of 200–250 psi, fan modulation is used to cool the freon. Above 190° F., the fan drive is fully engaged. With respect to hydraulic temperature, modulation can occur in the range between about 240° and 260° F. The processor senses all of those signals, and operates the fan when any of them demand additional cooling. All ranges may be adjusted in the software for the microprocessor.

Another worthwhile benefit of the excess torque capacity of the wet clutch assembly of the present invention is the capability to operate the clutch in a continuous slip mode without damaging the clutch facing material. By monitoring engine speed, the clutch can be driven in order to provide increased fan speeds at lower engine speeds, and can then be prevented from overspeeding the fan at higher engine speeds. The latter feature prevents drawing unnecessary horsepower from the engine and overcooling of the engine, and is accomplished by electronically clipping the fan speed to some preset maximum speed.

An example will be enlightening in understanding the significance of the foregoing feature. It will be appreciated that the fan clutch includes a multiple plate wet clutch which is bathed in a continuous flow of oil, with the clutch area and the oil flow rate being high enough to allow the clutch to operate at high horsepower but in a continuous slip fashion.

In one illustrative example, a fan controlling the temperature in a typical engine operating between low engine speeds (e.g., typically about 1,100 rpm) and high engine speeds (e.g., typically about 2100 rpm) may be selectively controlled using the present invention. In a typical fan, it may be undesirable to operate the fan above a maximum rated speed (which will be assumed to be about 2700 rpm in the illustrative example). However, in some systems, the fan speed is proportional to the engine speed (i.e, typically about 1.2–1.4 times the engine speed) so that the fan may exceed the desirable limits at high engine speeds. In accordance with certain objects of the present invention, when the engine operates at certain predetermined higher speeds, the closed loop control system may be used to control and operate the fan in continuous slip mode and be "clipped" to a predetermined top operating fan speed to preserve engine efficiency and reduce noise. The system may clip the fan speed at any desired fan speed in response to system requirements and, preferably will be about 50–95% of the maximum rated fan speed.

Figure 6:
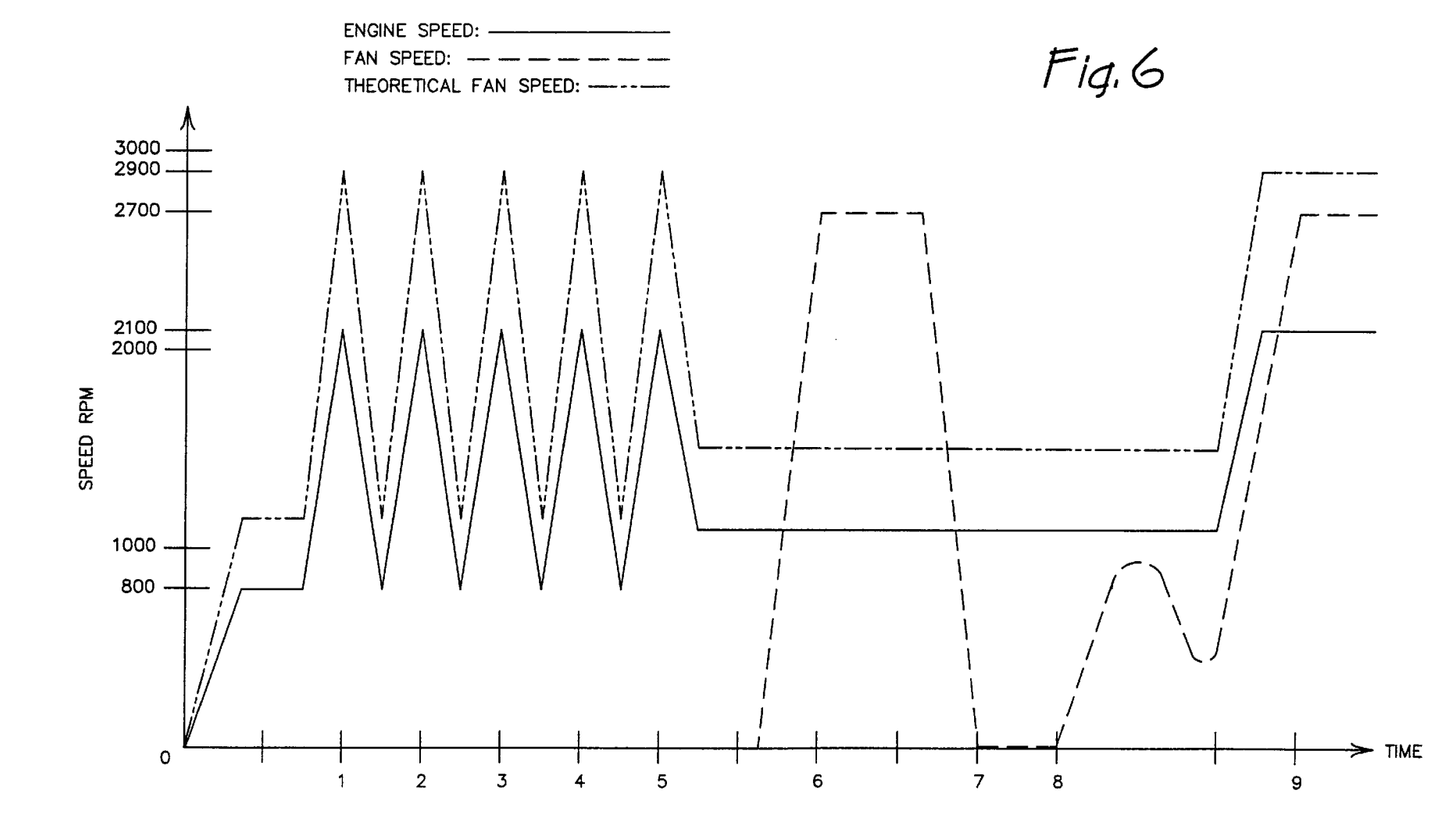
FIG. 6 is a schematic diagram illustrating the operation of the control system and the fan clutch in accordance with the present invention.

FIG. 6 a is schematic diagram illustrating the operation of the clipping mode of the control system. The solid and dashed lines represent the engine and fan speed. The broken line represents a "theoretical" fan speed in a system having a drive ratio of 1.4. In the illustrative example, a truck has a fan clutch and control system in accordance with the present invention. The fan clutch is set to run at full speed to achieve maximum heat rejection when the engine runs at low engine speeds (about 1100 rpm in the illustrative example). When the engine starts at time 0, the engine is cold and does not need cooling. When the engine is shifted from first gear to fifth gear (time 1–5), a theoretical fan would overspeed the fan above 2700 rpm. Since cooling is not yet required, however, the control system does not drive the clutch or the fan. When the engine is operating at 1100 rpm (at time 6), for example, when the truck is cruising at highway speeds, the control system positions the clutch to its fully engaged position so the fan is operating at fall speed and capable of maximum heat rejection. Under other conditions (time 7), even though the engine is operating at 1100 rpm, the engine will not require any cooling (for example, when the outdoor temperature is relatively cold or the engine otherwise has sufficient air flow) so that the control system positions the clutch in the declutched position so the fan is stationary. Under still other conditions (time 8), the engine may require less than full cooling (for example, the air flow through the engine due to vehicle movement is too low for adequate cooling) so that the control system positions the clutch in the slip mode between fully engaged and declutched positions to run the fan at less than full speed. As previously discussed, the cooling needs and the required clutch position and fan speed may be activated in response to a number of engine conditions including, for example, engine coolant temperature, freon temperature and/or pressure, hydraulic fluid temperature and/or pressure, oil temperature. As will be discussed later, the clutch has sufficient oil flow to dissipate the heat generated during the slip mode and full speed mode.

At time 9, it is assumed that the truck has encountered road conditions which require the engine to operate at about 2100 rpm for an extended period of time, for example, when the vehicle is traveling uphill. Since the drive ratio is such that the fan was capable of adequate cooling at about 1100 rpm engine speed, when the engine is operating at 2100 rpm, the fan is attempting to spin at about twice the speed required to cool the engine. The fan clutch will thereupon go into a "clipping" mode in which it will operate in a continuous slip mode adequate to cool the engine. In a preferred embodiment the clip mode is capable of operating on a continuous duty basis for two minutes or more in contrast to conventional clutches which would be otherwise damaged. In the worst case in the present example, the fan speed necessary to adequately cool the engine occurs at about 1100 rpm engine speed—about 50% of the driven fan speed. Thus, even though the engine is operating at 2100 rpm, the fan clutch has reduced the fan speed to the equivalent of an engine speed of 1100 rpm.

Keeping in mind that it is still necessary to get 55 horsepower through the slipping clutch, it will be appreciated that the friction between the clutch plates necessary to transmit that torque yet slip creates very significant heat in the clutch plates. While the heat problem may be addressed by increasing the size of the clutch plates, the size is limited by the envelope allotted for the clutch plates in the truck engine compartment. Thus, in the illustrative embodiment, the clutch has five plates, having a total clutch area of at least 130-square inches. In many conventional clutches, such clutches may overheat and be unable to operate on a continuous duty basis. Thus, the oil flow requirement of the present invention is also significant in that adequate engine oil flow passes over the clutch plates to carry the heat away so that the present clutch may operate on a continuous duty basis. The Pitot tube arrangement of the present invention is one mechanism for assuring the continuous oil flow without generating excessive oil pressure within the housing. It is important that the clutch have passages of significant size to distribute cooling oil flow over the clutch plates during the slipping mode.

The inputs shown in FIG. 5 are merely illustrative of the types of inputs which might be used in a practical system. Engine manufacturers are capable of sensing a number of engine operating conditions and have adequate information for producing an analog output signal which is related to a desired fan speed. The shortcoming with engines and vehicles which have been produced up until this time is the inability of the fan clutch mechanism itself to respond adequately to such a signal.

In accordance with the present invention, a fan clutch mechanism is provided which can respond, and thus the control signal of FIG. 5 becomes a practical reality. The processor thereupon outputs a signal on a line 230 which is preferably an analog signal having a continuously variable level indicative of a desired fan speed. Alternatively, the processor can output a digital signal which is converted to an analog signal, or yet a further alternative, a control mechanism can be provided which is capable of responding to a digital signal. In a particular preferred form of the invention, the processor can output a pulse width modulated pulse train, readily interpreted and compared to the speed sensor signal and producing an analog signal by a circuit at the input to the solenoid, and capable of driving the solenoid in the same fashion as a continuously variable analog signal generated by the microprocessor. In any event, and in the simplest configuration, a solenoid-operated valve system 231 is provided which responds to the signal 230 to control the valve 30, and the pressure in the pressure chamber 102 and, ultimately, the clutch mechanism 50 as has been described in detail above. The speed sensor 110 produces a fan speed input 235 which is coupled to the processor 220. The processor 220 can utilize an algorithm which matches the measured fan speed against the desired speed and adjusts the output signal 230 until the two match within a desired tolerance.

It will now be appreciated that an improved clutch drive assembly has been provided which is adapted for fitting the small envelopes typically defined in modern engines. It will be seen from inspection of FIG. 2 that the axial dimension of the assembly is very limited, less than about 8 inches and preferably about 7.3 inches, so that the clutch mechanism is readily positioned in the small axial space available between the radiator and the engine. The diameter of the housing is also compact, less than about 9.8 inches within the fan hub and less than about 6 inches at the pulley, so that a standard belt drive can be used. In order to fit within that confined package, the clutch mechanism is capable of operating under all engine operating conditions from high speed through idle and capable of generating 150 foot-pounds of torque and external control. The small envelope fan clutch mechanism 20 is also capable of operating a 55 horsepower fan at 2100 rpm. It should now be appreciated that the present invention has resulted in the ability to provide a continuously variable, fluid-actuated, externally controlled, wet clutch mechanism for an over-the-road vehicle, capable of fitting in a small envelope found in typical engines while simultaneously providing far superior functionality than has been achieved in the past.

Thus it will be seen that a novel and improved continuously variable pneumatic fan clutch has been provided which attains the aforementioned objects. Various additional modifications of the embodiments specifically illustrated and described herein will be apparent to those skilled in the art, particularly in light of the teachings of this invention. The invention should not be construed as limited to the specific form shown and described, but instead is set forth in the following claims.

What is claimed is:

1. A truck system comprising:
    an engine capable of operating between low and high engine speeds,
    a fan capable of rotating between a stationary speed and full speed and continuous variable speeds therebetween wherein the fan operates at full speed at low engine speeds and in continuous variable slip mode when the engine operates at higher speeds,
    a continuously variable, wet clutch assembly for controlling the fan speed including clutch plates selectively positionable between a fully engaged position wherein the fan operates at full speed, a fully released position wherein the fan is stationary, and continuously variable slip positions between fully engaged and released positions, and
    a closed loop electronic control system for controlling the fan speed in response to the engine speed.

2. The system of claim 1 wherein the fan operates at no more than a set, predetermined speed when the engine speed is over a predetermined level.

3. The system of claim 2 wherein the fan operates at full speed up to the predetermined level and in the slip mode when the speed is over the predetermined level.

4. The system of claim 3 wherein the fan operates at full speed when the engine speed is 1100 rpm and in the slip mode over 1100 rpm.

5. The system of claim 1 wherein the fan is adapted to operate at a speed proportional to the engine speed and wherein the electronic control system limits the fan speed to a predetermined amount so that the fan speed does not exceed a maximum rated fan speed.

6. The system of claim 5 wherein rated fan speed is about 3000 rpm.

7. The system of claim 1 wherein the control system limits the fan speed to minimize the load on the engine at predetermined conditions.

8. The system of claim 7 wherein the control system limits the fan speed to minimize the load on the engine at predetermined engine speeds.

9. The system of claim 1 wherein the clutch assembly is capable of dissipating the heat generated when the clutch operates in its continuously slip positions.

10. A system for controlling a fan speed in a vehicle engine comprising:
    a fan capable of rotating between a stationary speed and full speed and continuous variable speeds therebetween;
    a continuously variable, wet clutch assembly for controlling the fan speed including clutch plates selectively positionable between a fully engaged position wherein the fan operates at full speed and a fully released position wherein the fan is stationary and continuously variable positions between fully engaged and released positions, and a closed loop electronic control system for controlling the clutch position in response to the fan speed.

11. The system of claim 10 comprising electrical processor means for accepting a plurality of sensed signals from the vehicle and producing a single output signal for controlling the position of the clutch.

12. The system of claim 10 comprising a speed sensor for producing a signal representative of the rotational speed of the fan, and circuit means connected to the speed sensor for controlling the clutch position which determines the rotational speed of the fan.

13. The system of claim 12 comprising a processor connected to sense a plurality of engine conditions, the processor having a fan speed sensor input connected to the speed sensor, the processor having an output for controlling the clutch position.

14. The system of claim 13 wherein the engine conditions which the processor is connected to sense are selected from the group consisting of engine speed, engine coolant temperature, charge air temperature, freon pressure, freon temperature, hydraulic temperature and hydraulic pressure.

15. The system of claim 14 further including a fan drive oil temperature input for signaling a condition of overheating in the clutch assembly, and the processor including means for locking the clutch in the fully engaged position when overheating is detected.

16. The system of claim 13 wherein the engine conditions which the processor is connected to sense the engine speed.

17. The system of claim 16 wherein the fan is adapted to operate at a speed proportional to the engine speed and wherein the control system limits the fan speed to a predetermined amount so that fan speed does not exceed a maximum rated fan speed.

18. The system of claim 17 wherein the maximum rated fan speed is about 3000 rpm.

19. The system of claim 10 wherein the clutch assembly is fluid actuated.

20. The system of claim 19 wherein the positions of the clutch plates are controlled by a pneumatic actuator.

21. A continuously variable wet fan clutch adapted to complement the speed characteristics of an engine operating at low and high engine speeds and speeds between said low and high speeds, the fan clutch comprising in combination:

a belt drive from the engine to the fan clutch and adapted to overdrive the fan for cooling the engine at low cruising speeds, an electronic control system for the fan clutch including means for sensing the fan speed and operating the clutch in response thereto, the electronic control system including a processor adapted to respond to engine speed above a predetermined level and to drive the clutch in a continuous slip mode for so long as the engine speed exceeds said predetermined level.

22. The clutch of claim 21 comprising a plurality of clutch plates having a clutch plate area and cooling oil flow rate over the clutch plates adequate to allow the clutch to operate on a continuous duty basis in the slip mode.

23. The clutch of claim 22 wherein the clutch plates have an area of at least 130 square inches.

24. The clutch of claim 22 wherein the oil flow rate is at least 2 gallons per minute.

25. The clutch of claim 22 wherein the continuous duty basis requires the clutch to operate in the slip mode for more than 2 minutes.

26. A fan clutch package for use with an engine, in which the engine speed is adapted to cruise in a range of about 1100 rpm or less, yet capable of operating at speeds of about 2500 rpm or more, the engine requiring full cooling capacity for at least intervals when operating at low engine speeds, the fan clutch package comprising, in combination:

a driver for driving the fan clutch from the engine, and having a ratio of greater than one to over speed the fan, so that the fan operates at full cooling capacity with the engine operating at a speed of about 1100 rpm, an electronic control system for the fan clutch having an input for sensing engine speed, the control system sensing the onset of engine speed exceeding a predetermined threshold and adapted to switch the fan clutch into a continuous slip mode for so long as speed exceeds the threshold in order to reduce horsepower expenditure in the fan.

27. The clutch package of claim 26 wherein the fan clutch is configured to dissipate substantial heat generated during the slip mode so as to provide the capacity for operating on a continuous duty basis.

28. The clutch of claim 22 wherein the continuous duty basis requires the clutch to operate in the slip mode for more than 2 minutes.

29. The truck system of claim 1 further comprising a fluid actuator arranged to controllably engage the clutch assembly, the electronic control system selectively controlling fluid flow to the fluid actuator in response to a plurality of sensed engine parameters to thereby selectively position the clutch assembly.

30. The continuously variable wet clutch of claim 21 further comprising a fluid actuator operating the clutch in a fully engaged position wherein the fan operates at full speed, a fully released position wherein the fan is stationary and continuously variable slip positions between fully engaged and released positions, the electronic control system selectively controlling fluid flow to the fluid actuator in response to a plurality of sensed engine parameters to thereby selectively position the clutch.

31. The clutch package of claim 26 further comprising a fluid actuator operating the clutch in a fully engaged position wherein the fan operates at full speed, a fully released position wherein the fan is stationary and continuously variable slip positions between fully engaged and released positions, the electronic control system selectively controlling fluid flow to the fluid actuator in response to a plurality of sensed engine parameters to thereby selectively position the clutch.

* * * * *